United States Patent Office 3,143,460
Patented Aug. 4, 1964

3,143,460
METHOD FOR MAKING PESTICIDE COMPOSITION OF A PESTICIDE-RESIN MIXTURE COATED ON GRANULES
David A. Pearce, Mission, Kans., assignor to Chemagro Corporation, New York, N.Y., a corporation of New York
No Drawing. Filed Feb. 23, 1960, Ser. No. 10,081
13 Claims. (Cl. 167—42)

The present invention relates to pesticides and more particularly to granular pesticides having granules of inert material covered with a coating containing an active ingredient.

Pesticides are available as both liquid and solid active agents and are frequently used in solid forms of finely divided material. For many applications in which such solid materials are used, granular materials have been found to be particularly advantageous and preferable to dusts which contain more finely divided materials. Granular materials are more easily handled and can be used to reach places such as the bottoms of lakes and ponds which are not readily reached by dusts or liquid sprays and they are also mixed with soils with considerably less difficulty and with greater uniformity than dusts.

Granular pesticides contain inert granular materials coated with active ingredients, and it is necessary to employ suitable techniques for applying such coatings. A number of known techniques which are useful for specific types of materials are as follows:

(1) A liquid pesticide is sprayed on an absorbent granular base material while it is tumbled or blended.

(2) A solid pesticide is dissolved in a relatively non-volatile solvent and sprayed on an absorbent granular diluent while tumbling or blending.

(3) The pesticide is dissolved in a volatile solvent and sprayed on a relatively non-absorbent granular diluent while tumbling or blending. Then the solvent is removed by passing air over the granules or by evacuating the blender, leaving the granules coated with pesticide.

(4) The pesticide is mixed with a clay and coated on sand granules by rolling pressure in a muller.

These methods are of limited usefulness since they cannot effect the coating of solids melting at high temperatures such as above 150° C. which are insoluble in conventional solvents. When absorbent granules are used, the pesticide may be absorbed into the interior of the granules making it less available and less effective, and, in addition, certain absorbent fillers accelerate the decomposition of some pesticides.

In another method, known as pelletizing, the pesticide is mixed with finely-powdered diluents and a volatile liquid, with or without adhesives to form a paste. The paste is then extruded or otherwise formed into granules which are then dried. However, this method involves several operations of a complex nature and is too costly.

The object of the present invention is to overcome these difficulties by providing a pesticide composition having a coating of solid pesticide and water soluble resin on non-absorbent granules and a method for manufacturing the composition.

It is a further object of the invention to provide a method for coating high melting solid pesticides on non-absorbent granules.

Other objects and purposes of the invention will be obvious from the following description and examples and from the claims.

According to the present invention, non-absorbent granules are coated with a solution of a water soluble resin is a volatile solvent which is a non-solvent for the pesticide and the mixture is blended until the granules are evenly coated. Then, before the solvent evaporates, and without stopping the blending operation, the solid pesticide, in finely-powdered form, is added. Finely powdered diluents may be added at this time together with the pesticide. Blending is continued until the granules are evenly covered with a mixture of pesticide and resin solution and then the solvent is evaporated, without stopping the blending, by evacuating the blender or by passing air or inert gas over the granules. When the granules are evenly coated with a solvent-free mixture of pesticide and water-soluble resin the evaporation and blending are discontinued.

This method provides granules containing high-melting, insoluble pesticides which otherwise could be made only by pelletizing, a more laborious and costly process, and further provides granules which are relatively free from more finely divided particles. By the use of water-soluble resins the pesticide is more readily released on exposure of the granules to soil or atmospheric conditions.

The non-absorbent granules used have a particle size of about 10 to about 100 mesh and preferably about 20 to about 60 mesh, U.S. Standard Sieve and may be any inert, non-absorbent material such as calcite, talc, pyrophyllite, silica sand, pumice stone, slate or gypsum.

Water soluble resins or polymers used should be solid at ordinary temperatures but any water-soluble resin which is also soluble in a volatile organic solvent to the extent of 25% or more to give a solution with viscosity of 1000 cps. or less at 20–30° C. would be suitable. Examples of resins which are satisfactory are polyethylene glycols having molecular weights of about 4000 to 6000 and known for example as Carbowax 400 and Carbowax 6000, block polymer condensates of polyoxypropylene with ethylene oxide which have average molecular weights of about 3000 to 5000 such as the Pluronic F series and condensates of alkyl phenols such as octylphenol with ethylene oxide in which the polyoxyethylene portion consists of from about 90% to about 99% of the molecule as, for example, Igepal CO 880 and Igepal CO 990, also polyvinyl alcohol. The water-soluble resin solution preferably has a viscosity of about 50 to about 1000 centipoises. The boiling point of the solvent preferably is between 35° C. and 85° C. The most useful solvent found is methylene chloride although other solvents, e.g., ethylene dichloride, 1,1,1-trichloroethane and trichlorotrifluoroethane (Freon–113), acetone, methanol and methyl acetate, may be used. However solvents with high or non-existent flash-points are preferred from the point of view of safety. The solvent must be inert to the pesticide and dissolve the resin but its composition is not otherwise critical since it is evaporated from the granules during the process and is not present in the final product.

The process is not limited to any specific pesticide although, as pointed out, it is particularly useful for high melting pesticides which are not soluble in conventional solvents. For example, the method has been found to be particularly useful with p-dimethylaminobenzenediazo sodium sulfonate which decomposes without melting at 200° C. and is known as Dexon, trans-1,2-bis(n-propylsulfonyl) ethylene which melts at 153°–154° C. and is known as Chemagro B–1843, 2,4-dichloro-6-o-chloroanilino-s-triazine, which melts at 159°–160° C. and is known as Dyrene and tetramethyl thiuram disulfide which melts at 155°–156° C. and is known as Thiram. The pesticide should have a particle size of about 0.5 micron to about 50 microns and preferably about 5–10 microns average particle diameter.

In place of Dyrene there can be employed any of the other haloaryl triazines disclosed in Wolf Patent 2,720,480. In place of trans-1,2-bis(n-propylsulfonyl) ethylene there can be employed other bis aryl and alkyl sulfonyl ethylenes as disclosed in Belgian Patent 543,377 and also bis alkylsulfonyldihaloethylene as disclosed in Raasch Patent 2,893,911.

In the case in which a finely powdered diluent is used, it should have a particle size less than 200 mesh and preferably about 325 mesh U.S. Standard Sieve. Suitable materials are various low-absorptive diluents, such as continental clay, talc, pyrophyllite, gypsum, calcium carbonate, etc. Of course, the diluent should be inert to the pesticide.

The above materials are used in amount of about 1% to about 10% water-soluble resin, about 2% to about 20% solvent, depending on the amount of resin, about 2% to about 20% pesticide, about 0% to about 20% finely divided diluent and 50% to 97% non-absorbent granular material. As used herein all parts and percents are by weight based on the weight of the final composition, unless otherwise indicated. The weight of the solvent is based on the weight of non-volatile ingredients (e.g., parts by weight of solvent per 100 parts of non-volatile ingredients). As an example of the process, the following materials were mixed.

Solution A.
3 lbs. polyethylene glycol, molecular weight 4000
6 lbs. methylene chloride Mixture B:
5 lbs Chemagro B-1843 (fungicide)
5 lbs. continental clay The polyethylene glycol was dissolved in the solvent, and the fungicide and clay were separately mixed together. The solid mixture was air milled to an average particle diameter of 3 microns as determined on a Fisher subsieve sizer.

Eigthy-seven pounds of calcite granules of about 30 to 60 mesh size were placed in a Nauta blender and the blender was started. Then Solution A was poured onto the granules and blending was continued until the granules were evenly covered with the solution and had the consistency of wet sand, which required about 3 minutes. With the blender still operating, Mixture B was added, and, after about 5 minutes, the granules were evenly coated. Then, without stopping the blender, air was drawn across the surfaces of the granules for about 10 minutes and until the solvent had evaporated and the granules were free flowing. The resulting product was substantially free of finely divided particles finer than 60 mesh on a U.S. Standard Sieve.

The process permits the manufacture of granular products containing high-melting, insoluble pesticides which otherwise could be made only by pelletizing which is more laborious and costly. Since a water-soluble resin is used, the active pesticide agent is released easily and is readily available when the granules are placed in contact with soil or water. In addition, the process results in a non-dusty product having good handling characteristics and having a minimum of fine powdery materials smaller than about 60 to 100 mesh.

While a preferred embodiment has been described, various changes may be made in the details of composition and manipulation without departing from the essential scope of the invention as set forth in the claims.

I claim:

1. A method for manufacturing a non-dusty, free-flowing granular pesticide composition comprising blending together a water-soluble resin, a volatile solvent for said resin and an inert non-absorbent granular material until the granules are uniformly covered and have the consistency of wet sand, blending with the resulting wet sand-like mixture a finely divided solid pesticide insoluble in said solvent and evaporating the solvent from the resulting blend.

2. A method for manufacturing a pesticide composition as set forth in claim 1 in which the granules have a particle size of from 20 to 60 mesh.

3. A method for manufacturing a pesticide composition as set forth in claim 2 in which the granules are selected from the group consisting of calcite, talc, pyrophyllite, slate and silica sand.

4. A method for manufacturing a pesticide composition as set forth in claim 2 in which the pesticide melts at a temperature greater than 150° C.

5. A method for manufacturing a pesticide composition as set forth in claim 1 in which the water-soluble resin is polyethylene glycol having a molecular weight of about 4000 to about 6000.

6. A method for manufacturing a pesticide composition as set forth in claim 1 in which the water-soluble resin is a block polymer condensate of ethylene oxide with polyoxypropylene having an average molecular weight of about 3000 to about 5000.

7. A method for manufacturing a pesticide composition as set forth in claim 1 in which the water-soluble resin is a condensate of ethylene oxide with alkyl phenol in which the polyoxyethylene portion of the molecule constitutes 90% to 99% of the molecular weight of the resin.

8. A method for manufacturing a pesticide composition as set forth in claim 1 in which the water-soluble resin is used in an amount of about 1% to about 10% and the pesticide is used in an amount of about 2% to about 20% of the final granular product and the solvent is used in an amount of about 2% to about 20% based upon the composition before drying.

9. A method for manufacturing a pesticide composition as set forth in claim 1 in which the volatile solvent is methylene chloride.

10. A method for the manufacturing a pesticide composition as set forth in claim 1 in which the pesticide is p-dimethylaminobenzenediazo sodium sulfonate.

11. A method for the manufacturing a pesticide composition as set forth in claim 1 in which the pesticide is trans-1,2-bis(n-propylsulfonyl)ethylene.

12. A method for the manufacturing a pesticide composition as set forth in claim 1 in which the pesticide is 2,4-dichloro-6-o-chloroanilino-s-triazine.

13. A method for the manufacturing a pesticide composition as set forth in claim 1 in which the pesticide is tetramethyl thiuram disulfide.

References Cited in the file of this patent

UNITED STATES PATENTS

| | | |
|---|---|---|
| 2,696,453 | Sanders | Dec. 7, 1954 |
| 2,777,959 | Veaux et al. | Jan. 15, 1957 |
| 2,872,368 | Sanders | Feb. 3, 1959 |
| 2,898,267 | Linder | Aug. 4, 1959 |
| 2,966,440 | Gerolt | Dec. 27, 1960 |

OTHER REFERENCES

Shell: Handbook of Aldrin, Dieldrin, and Endrin Formulations, 1954, pp. 21–24.

Gans: J. Am. Pharm. Assoc., vol. XLIII, No. 8, August 1954, pp. 483–488.

Notice of Adverse Decision in Interference

In Interference No. 95,283 involving Patent No. 3,143,460, D. A. Pearce, METHOD FOR MAKING PESTICIDE COMPOSITION OF A PESTICIDE-RESIN MIXTURE COATED ON GRANULES, final judgment adverse to the patentee was rendered July 1, 1968, as to claims 1, 2, 3, 4 and 8.

[*Official Gazette August 20, 1968.*]